(12) United States Patent
Lund et al.

(10) Patent No.: US 10,539,464 B2
(45) Date of Patent: Jan. 21, 2020

(54) IMAGING SYSTEMS AND METHODS

(71) Applicant: Sensors Unlimited, Inc., Princeton, NJ (US)

(72) Inventors: Joshua Lund, Dallas, TX (US); John Liobe, New York, NY (US)

(73) Assignee: Sensors Unlimited, Inc., Princeton, NJ (US)

( * ) Notice: Subject to any disclaimer, the term of this patent is extended or adjusted under 35 U.S.C. 154(b) by 166 days.

(21) Appl. No.: 15/890,263

(22) Filed: Feb. 6, 2018

(65) Prior Publication Data
US 2019/0242750 A1    Aug. 8, 2019

(51) Int. Cl.
*G01J 3/28*    (2006.01)
*G01J 3/02*    (2006.01)

(52) U.S. Cl.
CPC .......... *G01J 3/2823* (2013.01); *G01J 3/0278* (2013.01); *G01J 3/2803* (2013.01); *G01J 2003/2826* (2013.01)

(58) Field of Classification Search
CPC ............... G01J 3/2823; G01J 3/2803; G01J 2003/2826; H01L 27/14609
See application file for complete search history.

(56) References Cited

U.S. PATENT DOCUMENTS 7,534,984 B2    5/2009    Gleckler
9,448,110 B2    9/2016    Wong

FOREIGN PATENT DOCUMENTS

EP        1212580 A2    6/2002

*Primary Examiner* — Maurice C Smith
(74) *Attorney, Agent, or Firm* — Locke Lord LLP; Scott D. Wofsy; Judy R. Naamat

(57) ABSTRACT

An imaging method includes assigning pixels within the extent of a focal plane array active area to a first readout range and a second readout range. Image data is read out from the pixels assigned to the first readout range and the second readout range. Pixels located within the extend of the focal plane array active area and not assigned to the first readout range or the second readout range are left unread. Imaging systems and hyperspectral imaging arrangements are also described.

17 Claims, 3 Drawing Sheets

IMAGING SYSTEMS AND METHODS

BACKGROUND OF THE INVENTION

1. Field of the Invention

The present disclosure relates to imaging, and more particularly to hyperspectral imaging systems and methods.

2. Description of Related Art

Spectral imaging, also known as hyperspectral imaging, is commonly used for imaging scenes using spectral (color) information beyond that of available in the visible wavebands. Image data acquired from hyperspectral imaging devices can be considered a data cube composed of image data layers, with each layer corresponding to information obtained from a discrete wavelength or waveband. Since different wavelengths (or wavebands) convey different information for a scene being imaged, hyperspectral imaging devices can provide information about a scene otherwise unavailable from other imaging devices. The data is typically generated employing a spectrometer, which separates electromagnetic information received from the scene into discrete wavelengths (or wavebands) and applied to a pixel array.

The pixel array is typically a continuous array arranged as an x-y matrix. In some systems the spectrometer illuminates specific bands of the pixel array with bars of wavelengths, pairs of bars separated by portions of the pixel array which are not illuminated during imaging and which do not generate image data. When the pixel array is read out information from the unilluminated pixels is discarded and the data cube populated using information from illuminated pixels only. Some devices employ optics to register discrete wavelengths to the pixel array.

Such conventional methods and systems have generally been considered satisfactory for their intended purpose. However, there is still a need in the art for improved imaging systems and methods. The present disclosure provides a solution for this need.

SUMMARY OF THE INVENTION

An imaging method includes assigning pixels within a focal plane array (FPA) active area extent to a first readout range and a second readout range. Image data is read out from the pixels assigned to the first readout range and the second readout range. Pixels located not assigned to the first readout range or the second readout range are left unread.

In certain embodiments the second readout range can abut the first readout range. The second readout range can be spaced apart from the first readout range by the pixels left unread. A first gain can be applied to a first set of pixels within the first readout range. A second gain can be applied to a second set of pixels within the first readout range. A slit of illumination can be applied to the pixels assigned to the first readout range. Pixels not assigned to the first readout range remain unilluminated, i.e., do not receive illumination.

In accordance with certain embodiments, the illumination slit can having illumination with at least first and second wavelengths. Illumination having the second wavelength can be incident upon the FPA active extent at a location spaced apart from illumination incident the FPA active extent and having the first wavelength. The first gain can be applied to image data acquired from pixels receiving illumination having the first wavelength. The second gain can be applied to image data acquired from pixels receiving illumination having the second wavelength.

An imaging system includes an FPA having an active area with a pixel array and ROIC in electrical communication with the pixel array of the FPA. A controller is operably connected to the ROIC and is disposed in communication with a non-transitory machine readable memory. The memory has instructions recorded on it that, when read by the controller, cause the controller to assign pixels within a focal plane (FPA) active area extent to a first readout range and readout range, read out image data from pixels assigned to the first readout range and the second readout range, and leave unread pixels located within the FPA active area extent and not assigned to the first readout range and the second readout range.

In certain embodiments the instructions can further cause the controller to assign pixels within the FPA active area to the first and second readout ranges such that the second readout range abuts the first readout range. The instructions can cause the controller to assign pixels within the FPA active area to first and second readout ranges such that the second readout range is spaced apart from the first the readout range. A first gain can be applied to image data acquired from a first set of pixels within the first readout range. A second gain can be applied to image data acquired from a second set of pixels within the first readout range.

In accordance with certain embodiments the imaging system can include a multi-slit spectrometer. The multi-slit spectrometer can be optically coupled to the FPA and configured to apply a slit of illumination to the pixels assigned to the readout range. The multi-slit spectrometer can be configured to leave unilluminated pixels outside of the readout range. The multi-slit spectrometer can be configured to illuminate the pixels assigned to the first readout range with illumination having a first wavelength and a second wavelength. The illumination having the second wavelength can be incident the FPA at a location spaced apart within the first readout range from illumination incident the FPA and having the first wavelength. A first gain can be applied to image data acquired from pixels receiving illumination having the first wavelength. A second gain can be applied to image data acquired from pixels receiving illumination having the second wavelength.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
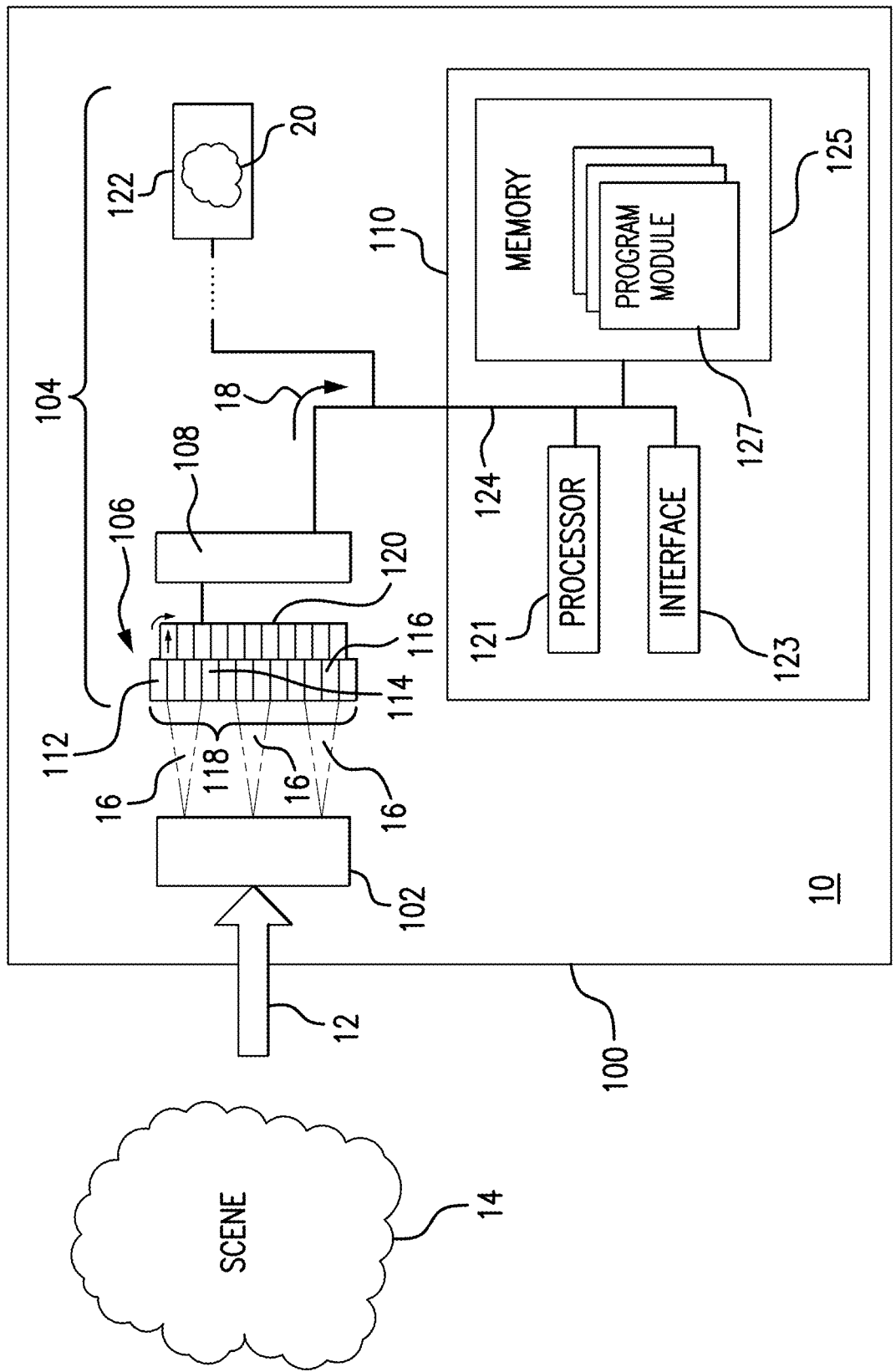
FIG. 1 is a schematic view of an exemplary embodiment of a hyperspectral imaging arrangement with an imaging system constructed in accordance with the present disclosure, showing a multi-slit spectrometer optically coupled to a focal plane array (FPA) and a readout integrated circuit disposed in electrical communication with the FPA.

Reference will now be made to the drawings wherein like reference numerals identify similar structural features or aspects of the subject disclosure. For purposes of explanation and illustration, and not limitation, a partial view of an exemplary embodiment of an imaging system 100 in accordance with the disclosure is shown in FIG. 1 and is designated generally by reference character 100. Other embodiments of imaging arrangements, imaging systems, and imaging methods in accordance with the disclosure, or aspects thereof, are provided in FIGS. 2 and 3, as will be described. The systems and methods described herein can be used imaging systems used for vehicle navigation, such as in rotorcraft, though the present disclosure is not limited to rotorcraft or to vehicles in general.

Referring to FIG. 1, a hyperspectral imaging arrangement 100 is shown. Hyperspectral imaging arrangement 100 is carried by a vehicle 10, e.g., a rotorcraft, and includes a hyperspectral optical system 102 and an imaging system 104. Hyperspectral optical system 102 is configured to receive reflected illumination 12 from a scene of interest 14 and convey reflected illumination 12 as a plurality of waveband slits 16 to imaging system 104.

Imaging system 104 includes a focal plane array (FPA) 106 having an active pixel extent 118, a readout integrated circuit (ROIC) 108, and a controller 110. FPA 106 is optically coupled to hyperspectral optical system 102, and therethrough to scene of interest 14, and includes a pixel array 112 with at least a first pixel 114 and a second pixel 116. ROIC 108 is disposed in electrical communication 120 with FPA 106 and is configured and adapted for reading out image data from each pixel of pixel array 110. Controller 110 is operatively connected to ROIC 108 and is configured to more closely match the pixels read out from the FPA 106 to those illuminated by hyperspectral optical system 102.

As will be appreciated by those of skill in the art in view of the present disclosure, multi-slit spectrometers typically illuminate an FPA with illumination bars having a plurality of wavelengths that are spatially distributed across the FPA. The illumination bars are generally spaced apart from one another on the FPA such that focal plane array pixels in the space between the bars may either not be illuminated or do not receive a useful signal. In systems where the entire FPA is read out to generate image data, information from the pixels that are not illuminated, or which do not receive a useful signal band, is discarded. Since reading out data from pixels that are unilluminated or which do not generate useful data can waste bandwidth and power, some systems employ FPAs sized to match the illumination bands. This can avoid the need to discard information, but complicates the configuration and manufacture of the system due to the need to register the FPA with the illumination bars presented to the FPA.

In embodiments described herein imaging system 104 includes an FPA 106 that is "soft registered" to hyperspectral optical system 102. More particularly, controller 110 is configured to selectively read out one or more rows (or columns) of pixels disposed within an FPA active pixel extent 118 and not read out one or more rows (or columns) of pixels disposed within FPA active pixel extent 118. In certain embodiments, controller 110 is configured to apply more than one gain pixels read out from FPA active pixel extent 118.

As shown in FIG. 1, controller 110 includes a processor 121, an interface 123, and a memory 125. Memory 125 has a plurality of program modules 127 recorded on it that, when read by processor 121, cause controller to execute certain operations, e.g., imaging method 200 (shown in FIG. 3). In this respect controller 110 is configured to read out image data 18 from certain pixels, e.g., first pixel 112, not read out other pixels, e.g., second pixel 114, apply a gain to image data 18, and generate an image 20 of scene of interest 14. Image 20 can be displayed on a display 122 disposed in communication with controller 110, e.g., via a link 124.

Figure 2:
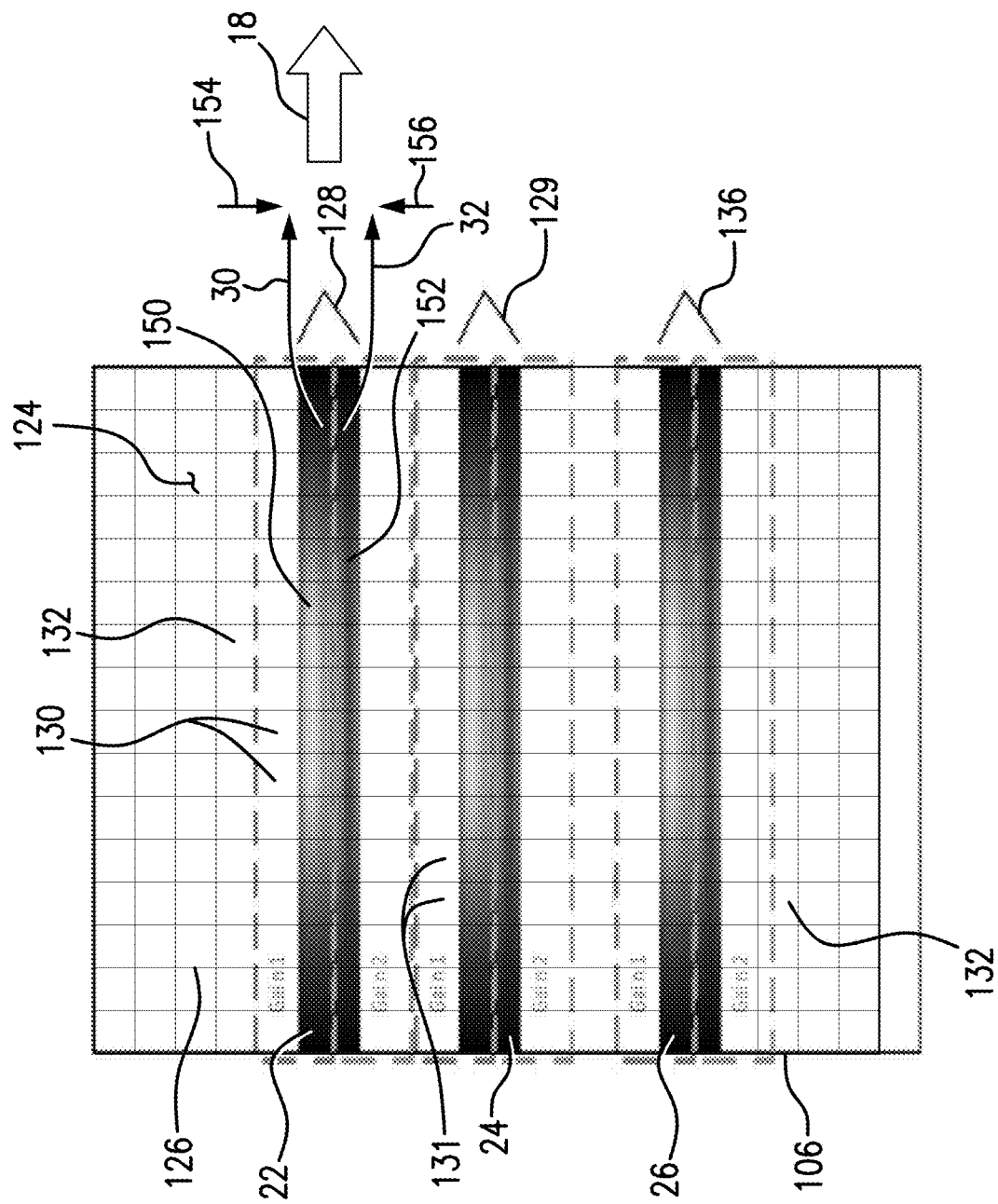
FIG. 2 is a plan view of the FPA of the imaging system of FIG. 1, showing the FPA active area pixel extent with readout range assignments, illumination slits incident upon the FPA active area, and gain assignments to pixels within the respective readout ranges.

With reference to FIG. 2, FPA 106 is shown. FPA 106 of imaging system 104 (shown in FIG. 1) includes an active area 124 with a pixel array 126. ROIC 108 (shown in FIG. 1) is in electrical communication each of the pixels of pixel array 126. Controller 110 (shown in FIG. 1) is operably connected to ROIC 108 and is configured to assign pixels within a FPA active area 124 extent to a first readout range 128 and a second readout range 129, read out image data from pixels 130 assigned to readout range 128 and readout image data from pixels 131 assigned to second readout range 129, and leave unread pixels 132 within FPA active area 124 and not assigned to first readout range 128 and second readout range 129.

In the illustrated exemplary embodiment readout range 128 a third readout range 136. Pixels within the extent of FPA active area 124 are assigned by controller 110 and include a different subset of pixels, e.g., pixels 160 and 162. In the illustrated exemplary embodiment second readout range 129 is assigned such that pixels assigned to second readout range 129 abut pixels assigned to first readout range 128, and third readout range 136 is assigned such that pixels of third readout range 136 are spaced apart from pixels of second readout range 129 by an unread pixel range 133. As will be appreciated by those of skill in the art in view of the present disclosure, readout range assignment can be customized according the requirements of a given application and can include more than three or fewer than three readout ranges, as appropriate for an intended application. As will also be appreciated by those of skill in the art in view of the present disclosure, readout ranges can abut, be spaced apart by single rows of pixels, or be spaced apart by multiple rows of pixels, as suitable for an intended application.

It is contemplated that spectrometer 102 (shown in FIG. 1) include a multi-slit spectrometer. In this respect multi-slit spectrometer 102 is optically coupled to FPA 106 such that a first illumination slit 22, a second illumination slit 24, and a third illumination slit 26 are each applied to (i.e. incident upon) active area 124 of FPA 106. First illumination slit 22, a second illumination slit 24, and a third illumination slit 26 each illuminate at least a portion of the pixels assigned to a particular readout range. In the illustrated exemplary embodiment first illumination slit 22 is incident upon a portion of first readout range 128, second illumination slit 24 is incident upon a portion of second readout range 129, and third illumination slit 26 is incident upon a portion of third readout range 136. Multi-slit spectrometer 102 also leaves unilluminated pixels 140 outside of the readout ranges.

Within each readout range multi-slit spectrometer 102 provides an illumination slit having a plurality of wavelengths, e.g., a first wavelength 150 and a second wavelength 152. Image data 30 from pixels illuminated with first wavelength 150 receives a first gain 154 and image data 32 from pixels illuminated with second wavelength 152 receives a second gain 156. Second gain 156 is greater than first gain 154 which compensates for the reduced signal that certain wavelengths may generate in pixels at different locations on pixel array 126 receiving different wavelengths. For example, signals generated by infrared wavelengths can have gains applied that are greater than gains applied to signal generated by visible wavelengths, improving the sensitivity of imaging system 104. This reduces noise in image data 18 generated by differently gained image data 30 and image data 32.

Figure 3:
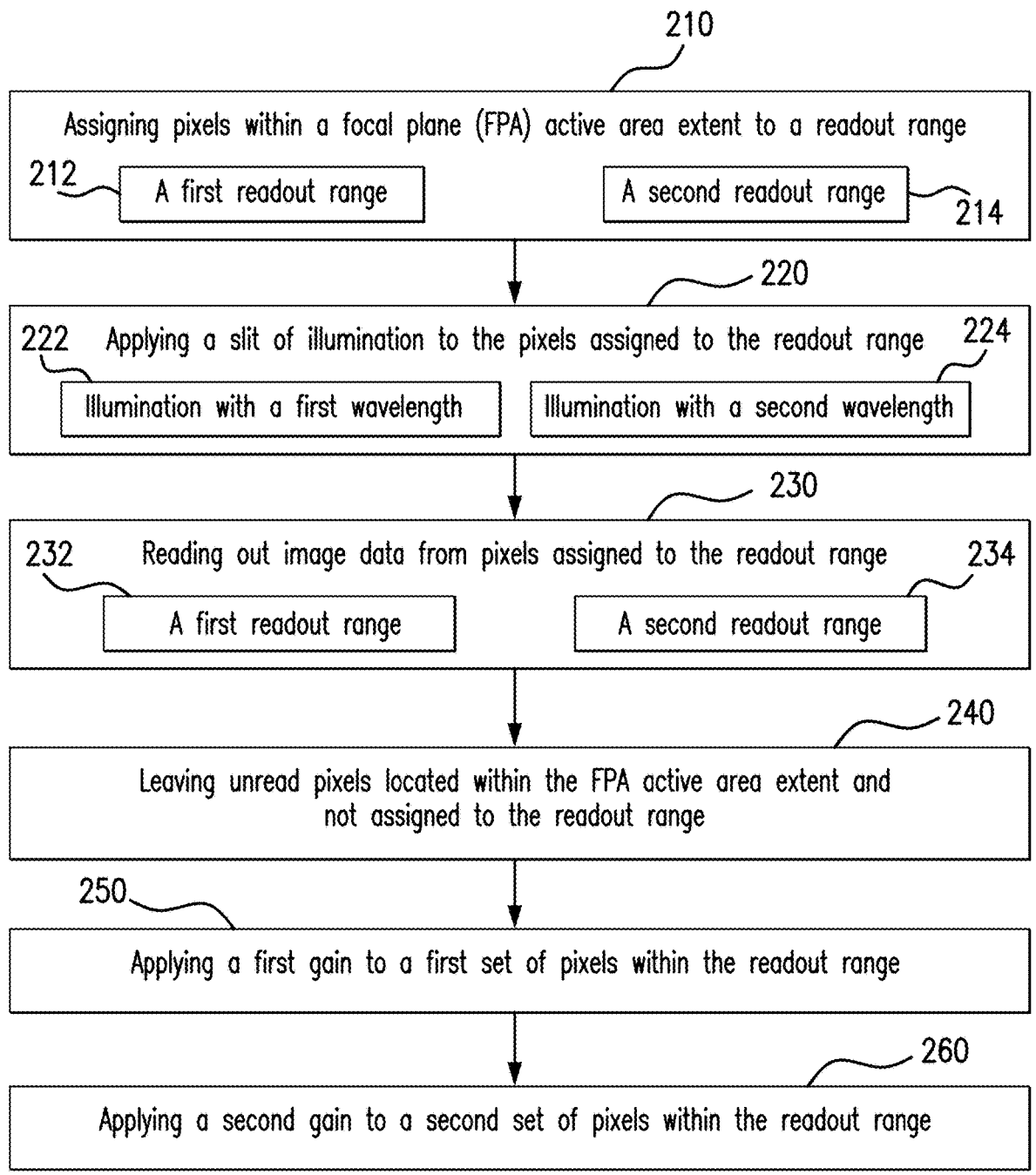
FIG. 3 is a box diagram of an imaging method, showing steps of the imaging method according to an exemplary embodiment.

With reference to FIG. 3, imaging method 200 is shown. Imaging method 200 includes assigning pixels within an FPA pixel array, e.g., FPA pixel array 112 (shown in FIG. 1), to a readout range, e.g., readout range 128 (shown in FIG. 2), as shown with box 210. Assigning pixels from the pixel array can include grouping the pixels into a plurality of readout ranges, e.g., a first readout range 128 (shown in FIG. 2) and a second readout range 134 (shown in FIG. 2), as shown with boxes 212 and 214.

The FPA pixel array is illuminated by a spectrometer, e.g., with hyperspectral optical system 102 (shown in FIG. 1). The illumination is applied in one or more illumination slits, e.g., waveband slit 16 (shown in FIG. 1), to pixels assigned to readout range, as shown with 220. The illumination slit includes a plurality of wavelengths, e.g., a first wavelength 150 (shown in FIG. 2) and a second wavelength 152 (shown in FIG. 2), spatially distributed over the FPA pixel array, as shown with boxes 222 and 224.

Image data is then readout from pixels within the readout range, as shown with box 230. Reading out the image data can include reading out image data from a plurality of readout ranges, as shown with boxes 232 and 234. Reading out the image data includes leaving unread pixels located within the FPA active area and outside of readout range, as shown with box 240. Image data from the first readout range can receive a first gain, as shown with box 250, and image data from the second readout range can receive a second gain, as shown with box 260. As will be appreciated by those of skill in the art in view of the present disclosure, applying different gains can improve the image data derived from wavelengths to which pixels in the pixel array have relatively low sensitivity.

The pixel array can be illuminated and image data read out from the pixels assigned to the readout range, as shown with box 220. Pixels can be read out from a plurality of readout ranges, e.g., from the first readout range and the second readout range, as show with boxes 222 and 224. Pixels located with the extent of the FPA active area extend and not assigned to the readout range(s) can be left unread, as shown with box 230.

An imaging method includes assigning pixels within a focal plane array (FPA) active area extent to a readout range reading out image data from the pixels assigned to the readout range. Pixels located not assigned to the readout range are left unread.

In certain embodiments the readout range can be a first readout range and pixels within the FPA active area can be assigned to a second readout range. Image data from the second readout range can be read from pixels assigned to the second readout range. The second and second readout range can abut one another or be spaced apart from one another.

In accordance with certain embodiments a first gain can be applied to a first set of pixels within the readout range. A second gain can be applied to a second set of pixels within the readout range. A slit of illumination can be applied to the pixels assigned to the readout range. Pixels not assigned to the readout range remain unilluminated, i.e., do not receive illumination.

The first gain can be applied to image data acquired from pixels receiving illumination having the first wavelength. The second gain can be applied to image data acquired from pixels receiving illumination having the second wavelength.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is intended to provide a brief, general description of an illustrative and/or suitable exemplary environment in which embodiments of the above described present invention may be implemented. FIG. 1 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for imaging systems and methods with superior properties including flexibility in the assignment readout pixels in FPA active area to match the spatial arrangement of multi-slit hyperspectral optical systems, reduction in bandwidth and processing capability necessary for image data acquired using hyperspectral imaging systems, and/or signal gain biasing to address the signal strength range that can be present within the slot presented to the FPA in certain of hyperspectral optical systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging method, comprising:
assigning pixels within a focal plane (FPA) active area extent to a first readout range and a second readout range;
reading out image data from pixels assigned to the first readout range;
reading out image data from pixels assigned to the second readout range; and
leaving unread pixels located within the FPA active area extent and not assigned to the first readout range or the second readout range, further comprising applying a first gain to a first set of pixels within the first readout range, and applying a second gain to a second set of pixels within the first readout range.

2. The imaging method as recited in claim 1, wherein the second readout range abuts the first readout range.

3. The imaging method as recited in claim 1, wherein the second readout range is spaced apart from the first readout range.

4. The imaging method as recited in claim 1, applying a slit of illumination to the pixels assigned to the first readout range.

5. The imaging method as recited in claim 4, wherein pixels outside of the first readout range and the second readout range do not receive illumination.

6. The imaging method as recited in claim 4, wherein the slit of illumination includes illumination having a first wavelength and a second wavelength, wherein illumination having the second wavelength is incident on the FPA at a location spaced apart from illumination incident on the FPA and having the first wavelength.

7. The imaging method as recited in claim 6, further comprising applying a first gain to image data acquired from pixels receiving illumination having the first wavelength, and applying a second gain to image data acquired from pixels receiving illumination having the second wavelength.

8. The imaging method as recited in claim 1, further comprising one or more pixels assigned to an unread pixel range.

9. The imaging method as recited in claim 8, wherein the unread pixel range is located between the first readout range and the second readout range.

10. An imaging system, comprising:
a focal plane array (FPA) having an active area with a pixel array;
a readout integrated circuit (ROIC) in electrical communication with the pixel array; and
a controller operably connected to the ROIC and disposed in communication with a non-transitory machine readable memory having instructions recorded on it that, when read by the controller, cause the controller to:
assign pixels within a focal plane (FPA) active area extent to a first readout range and a second readout range;
read out image data from pixels assigned to the first readout range and the second readout range; and
leave unread pixels located within the FPA active area extent and not assigned to the first readout range and the second readout range, wherein the instructions further cause the controller to apply a first gain to image data acquired from a first set of pixels within the first readout range, and apply a second gain to image data acquired from a second set of pixels within first readout range.

11. The imaging system as recited in claim 10, wherein the second readout range abuts the first readout range.

12. The imaging system as recited in claim 10, wherein the second readout range is spaced apart from the first readout range by pixels not assigned to the first readout range and the second readout range.

13. The imaging system as recited in claim 10, wherein the instructions further cause the controller assign pixels to a leave unread range, wherein the leave unread range is located with the extent of the FPA active area at a location spatially separating the second readout range from the first readout range.

14. A hyperspectral imaging arrangement, comprising:
an imaging system, comprising:
a focal plane array (FPA) having an active area with a pixel array;
a readout integrated circuit (ROIC) in electrical communication with the pixel array; and
a controller operably connected to the ROIC and disposed in communication with a non-transitory machine readable memory having instructions recorded on it that, when read by the controller, cause the controller to:
assign pixels within a focal plane (FPA) active area extent to a first readout range and a second readout range;
read out image data from pixels assigned to the first readout range and the second readout range; and
leave unread pixels located within the FPA active area extent and not assigned to the first readout range and the second readout range; and
a multi-slit spectrometer optically coupled to the FPA, the multi-slit spectrometer optically coupled to the FPA and configured to apply a slit of illumination to the pixels assigned to the first readout range and the instructions further cause the controller to:
apply a first gain to image data acquired from a first set of pixels within the first readout range; and
apply a second gain to image data acquired from a second set of pixels within the first readout range.

15. The hyperspectral imaging arrangement as recited claim 14, wherein the multi-slit spectrometer is configured to leave unilluminated pixels outside of the first readout range.

16. The hyperspectral imaging arrangement as recited claim 14, wherein the multi-slit spectrometer is configured to illuminate the pixels assigned to the first readout range with illumination having a first wavelength and a second wavelength, wherein illumination having the second wavelength is incident the FPA at a location spaced apart from illumination incident the FPA and having the first wavelength.

17. The hyperspectral imaging arrangement as recited in claim 16, wherein the instructions further cause the controller to apply the first gain to image data acquired from pixels receiving illumination having the first wavelength and apply the second gain to image data acquired from pixels receiving illumination having the second wavelength.

* * * * *